US 6,526,744 B2

(12) United States Patent
Ahrendt

(10) Patent No.: US 6,526,744 B2
(45) Date of Patent: Mar. 4, 2003

(54) SYSTEM AND METHOD FOR CONTROLLING THE STOWAGE OF JET ENGINE THRUST REVERSERS

(75) Inventor: Terry Ahrendt, Tempe, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/847,847

(22) Filed: Apr. 30, 2001

(65) Prior Publication Data
US 2002/0157377 A1 Oct. 31, 2002

(51) Int. Cl.⁷ .................................................. F02K 1/56
(52) U.S. Cl. .................... 60/204; 60/226.2; 244/110 B; 239/265.29
(58) Field of Search ............................. 60/226.2, 230, 60/204; 244/110 B; 239/265.19, 265.29, 265.27, 265.31

(56) References Cited

U.S. PATENT DOCUMENTS

| 1,175,346 A | | 3/1916 | Dearborn |
| 2,912,632 A | | 11/1959 | Turtil |
| 3,315,940 A | * | 4/1967 | Hordley .................. 239/265.19 |
| 3,514,952 A | | 6/1970 | Schumacher et al. |
| 3,515,361 A | | 6/1970 | Blackburn |
| 3,618,880 A | | 11/1971 | Hagaman et al. |
| 3,621,763 A | | 11/1971 | Geyer |
| 3,655,134 A | * | 4/1972 | Greenland et al. ...... 239/265.37 |
| 3,673,482 A | * | 6/1972 | Davey ......................... 318/266 |
| 3,696,895 A | | 10/1972 | Schaffer et al. |
| 3,714,535 A | | 1/1973 | Krivak et al. |
| 3,795,853 A | | 3/1974 | Whitehouse |
| 3,815,357 A | | 6/1974 | Brennan |
| 3,931,944 A | * | 1/1976 | Capewell et al. ...... 239/265.37 |
| 3,932,058 A | | 1/1976 | Harner et al. |
| 3,936,226 A | | 2/1976 | Harner et al. |
| 4,005,822 A | | 2/1977 | Timms |
| 4,040,581 A | * | 8/1977 | Schlanert et al. ........... 244/233 |
| 4,137,711 A | | 2/1979 | Montgomery |
| 4,184,107 A | | 1/1980 | Turnini et al. |
| 4,191,094 A | | 3/1980 | Flippo |

(List continued on next page.)

FOREIGN PATENT DOCUMENTS

| EP | 0 913 570 A2 | 6/1999 |
| EP | 1 004 798 A1 | 5/2000 |
| WO | PCT/US02/13744 | 8/2002 |

Primary Examiner—Ted Kim
(74) Attorney, Agent, or Firm—Keith A. Newburry, Esq.

(57) ABSTRACT

A system for controlling one or more jet engine thrust reversers includes a motor, a position sensing device, and a controller circuit. The motor is coupled to one or more jet engine thrust reverser moveable components for moving the one or more thrust reverser moveable components to at least a stowed position. The position sensing device is operable to sense at least when the one or more thrust reverser moveable components attain a predetermined position relative to the stowed position. The controller circuit has an output coupled to the motor so the motor rotates at a variable speed in response to a position sensing device that senses when the predetermined position is attained. The system controls the stowage operation of the jet engine thrust reversers such that structural damage is avoided, and/or a limit cycle condition is prevented, and/or engagement of stow locks is assured.

26 Claims, 6 Drawing Sheets

U.S. PATENT DOCUMENTS

| | | |
|---|---|---|
| 4,284,930 A | 8/1981 | Matty |
| 4,297,844 A | 11/1981 | Halin et al. |
| 4,383,647 A | 5/1983 | Woodruff et al. |
| 4,424,669 A | 1/1984 | Fage |
| 4,437,783 A | 3/1984 | Halin et al. |
| 4,442,928 A | 4/1984 | Eastman |
| 4,458,863 A | 7/1984 | Smith |
| 4,459,121 A | 7/1984 | Gazzera et al. |
| 4,462,207 A | 7/1984 | Hitchcock |
| 4,543,783 A | 10/1985 | Greune et al. |
| 4,546,783 A | 10/1985 | Lott |
| 4,585,189 A | 4/1986 | Buxton |
| 4,586,329 A | 5/1986 | Carlin |
| 4,607,202 A | 8/1986 | Koenig |
| 4,651,621 A * | 3/1987 | Eastman ................ 137/596.16 |
| 4,656,407 A | 4/1987 | Burney |
| 4,788,531 A | 11/1988 | Corwin et al. |
| 4,827,248 A | 5/1989 | Crudden et al. |
| 5,167,119 A | 12/1992 | Ward |
| 5,213,286 A | 5/1993 | Elliott et al. |
| 5,243,817 A | 9/1993 | Matthias |
| 5,267,436 A | 12/1993 | Wood, Jr. et al. |
| 5,282,719 A | 2/1994 | McCarty et al. |
| 5,313,788 A | 5/1994 | Wright et al. |
| 5,327,055 A | 7/1994 | Danielson et al. |
| 5,381,654 A | 1/1995 | Halin |
| 5,448,884 A | 9/1995 | Repp |
| 5,524,431 A | 6/1996 | Brusson et al. |
| 5,615,549 A | 4/1997 | Valleroy |
| 5,813,218 A | 9/1998 | Kohlbacher |
| 5,826,823 A * | 10/1998 | Lymons et al. ........ 239/265.29 |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 * | 1/2001 | Kovac ........................ 91/171 |
| 6,211,665 B1 | 3/2001 | Ahrendt et al. |
| 6,240,246 B1 | 5/2001 | Evans |
| 6,307,339 B1 | 10/2001 | Yourist et al. |

* cited by examiner

SYSTEM AND METHOD FOR CONTROLLING THE STOWAGE OF JET ENGINE THRUST REVERSERS

BACKGROUND OF THE INVENTION

The present invention relates to a system and method for controlling the movement of one or more jet engine thrust reverser components. More particularly, the present invention relates to a system and method for controlling the movement of one or more jet engine thrust reverser components during a stowage operation of the thrust reversers.

When jet-powered aircraft land, the landing gear brakes and imposed aerodynamic drag loads (e.g., flaps, spoilers, etc.) of the aircraft may not be sufficient to slow the aircraft down in the required amount of distance. Thus, jet engines on most aircraft include thrust reversers to enhance the stopping power of the aircraft. When deployed, thrust reversers redirect the rearward thrust of the jet engine to a forward direction, thus decelerating the aircraft. Because the jet thrust is directed forward, the aircraft will slow down upon landing.

Various thrust reverser designs exist in the art, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. As will be discussed more fully below, each of these designs employs a different type of "moveable thrust reverser component," as that term is defined herein below.

Cascade-type thrust reversers are normally used on high-bypass ratio jet engines. This type of thrust reverser is located at the engine's midsection and, when deployed, exposes and redirects air flow through a plurality of cascade vanes positioned on the outside of the engine. The moveable thrust reverser component in this design may include several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser component to block the entire jet thrust coming from the rear of the engine. These doors are mounted on the aft portion of the engine and form the rear part of the engine nacelle. Pivot door thrust reversers may utilize four doors on the engine nacelle as the moveable thrust reverser component. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process. More specifically, once the aircraft has touched down, the thrust reversers are deployed to assist in slowing the aircraft. Thereafter, when the thrust reversers are no longer needed, they are returned to their original, or stowed position. In the stowed position, one or more stow seals prevent air flow from flowing through the transcowls or doors, depending on the thrust reverser design. Moreover, stow locks are engaged to prevent unintended deployment of the thrust reversers.

When the thrust reversers are moved to the stowed position, the transcowls or doors must be held firmly against the stow seals while the stow locks are engaged. One problem associated with this operation is that structural damage may occur if the transcowls or doors are driven into the stow seals with too much force. Another problem occurs if power to move the transcowls or doors is removed too soon after the transcowls or doors contact the stow seals. In this case, the elasticity of the seals may push the transcowls or doors away from the seals before the stow locks are engaged. This latter problem may result in either a failure of the stow locks to engage or a limit cycle condition in which the thrust reverser system continuously cycles between hitting the seals and bouncing back off of them.

Hence, there is a need for a system for controlling the stowage of one or more jet engine thrust reversers that improves upon one or more of the drawbacks identified above. Namely, a system for controlling jet engine thrust reverser stowage that avoids structural damage by preventing the thrust reverser transcowls or doors from being driven into the stow seals with too much force, and/or that prevents the thrust reverser system from cycling between a stowed and a rebounded position, and/or that ensures the engagement of the stow locks.

SUMMARY OF THE INVENTION

The present invention provides a system and method for controlling the stowage of jet engine thrust reversers that avoids structural damage, and/or prevents a limit cycle condition, and/or ensures engagement of the stow locks.

In one aspect of the present invention, and by way of example only, a system for controlling one or more jet engine thrust reversers includes an electric motor, one or more moveable thrust reverser components, a position sensor, a controller circuit, and a timer circuit. The motor is coupled to the one or more moveable thrust reverser components for moving the one or more moveable thrust reverser components between a deployed position and a stowed position. The position sensor is operable to provide a position signal at least when the one or more moveable thrust reverser components attain a predetermined position relative to the stowed position. The controller is operably coupled to the motor and responsive to the position signal to rotate at a variable speed. The timer circuit has an output coupled to the controller circuit and is responsive to the position signal to cause the controller circuit to remove power to the motor a predetermined time period after the one or more moveable thrust reverser components attain the predetermined position.

In another aspect of the invention, a system for controlling one or more jet engine thrust reversers includes reverser moving means, position sensing means, controller means, and timer means. The moving means is for moving one or more thrust reverser moveable components to at least a stowed position. The position sensing means is for sensing at least when the one or more thrust reverser moveable components attain a predetermined position relative to the stowed position. The controller means is for causing the reverser moving means to move at a variable speed in response to the position sensing means sensing that the predetermined position is attained. The timer means causes the controller means to remove power supplied to the moving means a predetermined time period after the one or more moveable thrust reverser components attain the predetermined position.

In yet a further aspect of the present invention, a method of controlling one or more jet engine thrust reversers includes causing movement of one or more thrust reverser moveable components toward at least a stowed position. At least when the one or more thrust reverser moveable components attain a predetermined position relative to the stowed position is sensed. The speed of movement of the one or more thrust reverser moveable components is varied in response to the one or more thrust reverser moveable components attaining the predetermined position. The movement of the one or more thrust reverser moveable components is disabled a predetermined time period after sensing that the one or more moveable thrust reverser components have attained the predetermined position.

Other features and advantages of the present invention will become apparent from the following detailed description, taken in conjunction with the accompanying drawings, which illustrate, by way of example, the principles of the invention.

DETAILED DESCRIPTION OF THE INVENTION

Before proceeding with the detailed description of the invention, it is to be appreciated that the present invention is not limited to use in conjunction with a specific thrust reverser system design. Thus, although the present invention is explicitly described as being implemented in a cascade-type thrust reverser system, in which transcowls are used as the moveable thrust reverser component, it will be appreciated that it can be implemented in other thrust reverser system designs, including those described above.

Figure 1:
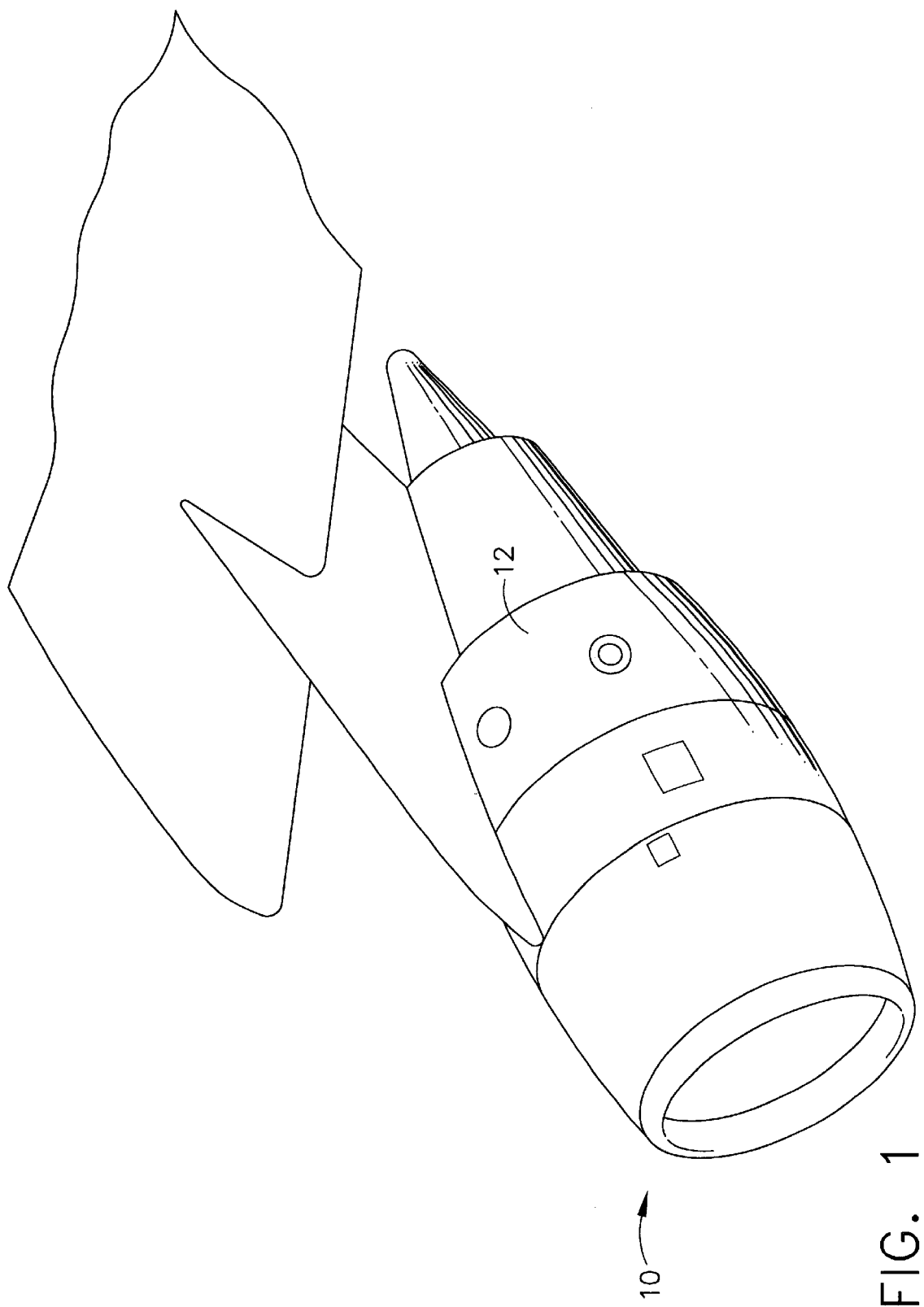
FIG. 1 is a perspective view of an aircraft engine.

Turning now to the description, and with reference first to FIG. 1, a perspective view of portions of an aircraft jet engine fan case 10 that incorporates a cascade-type thrust reverser is depicted. The engine fan case 10 includes a pair of semi-circular transcowls 12 that are positioned circumferentially on the outside of the fan case 10.

Figure 2:
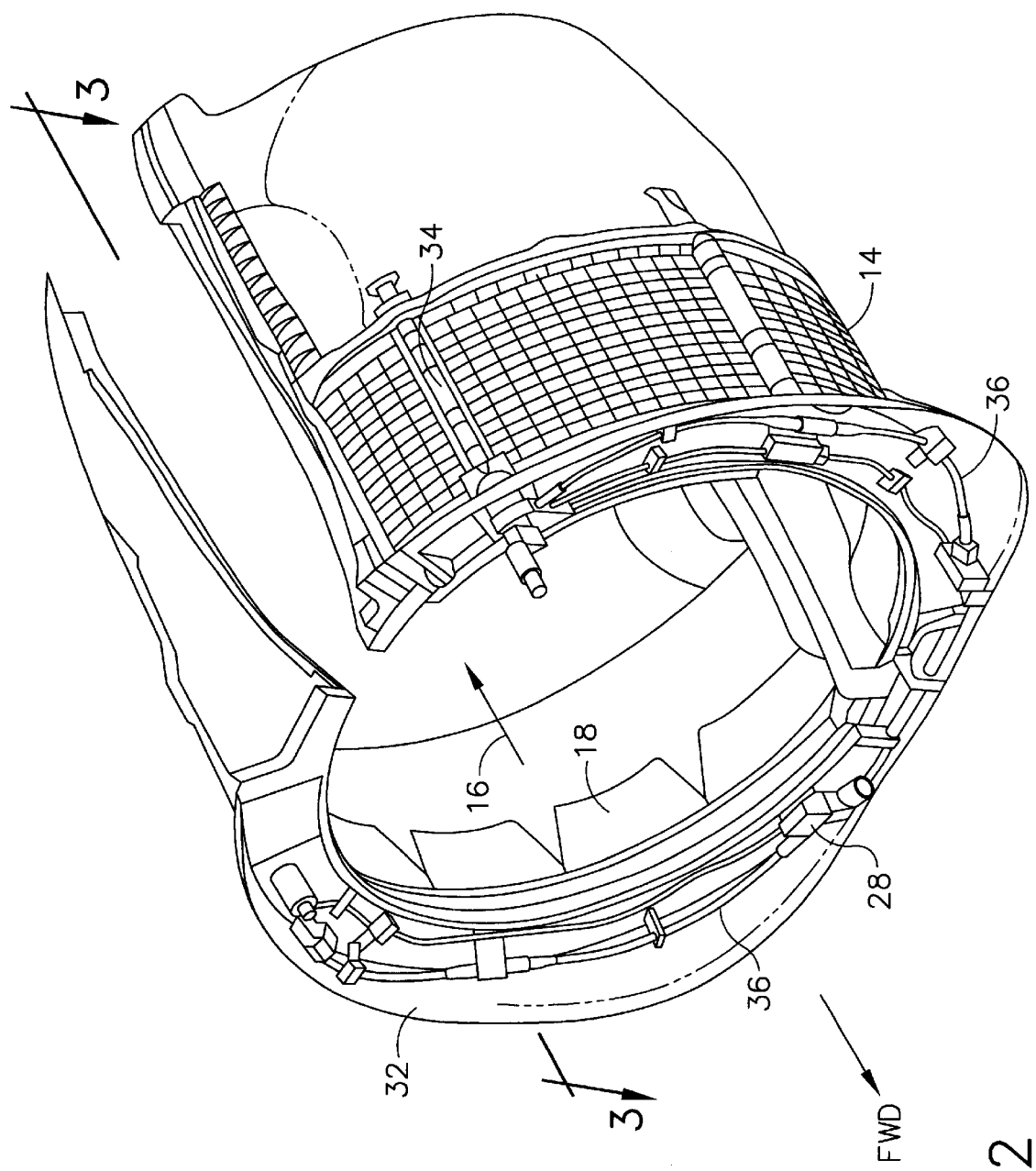
FIG. 2 is a perspective view of portions of an engine fan cowl and thrust reverser system utilized with the engine of FIG. 1.
Figure 3:
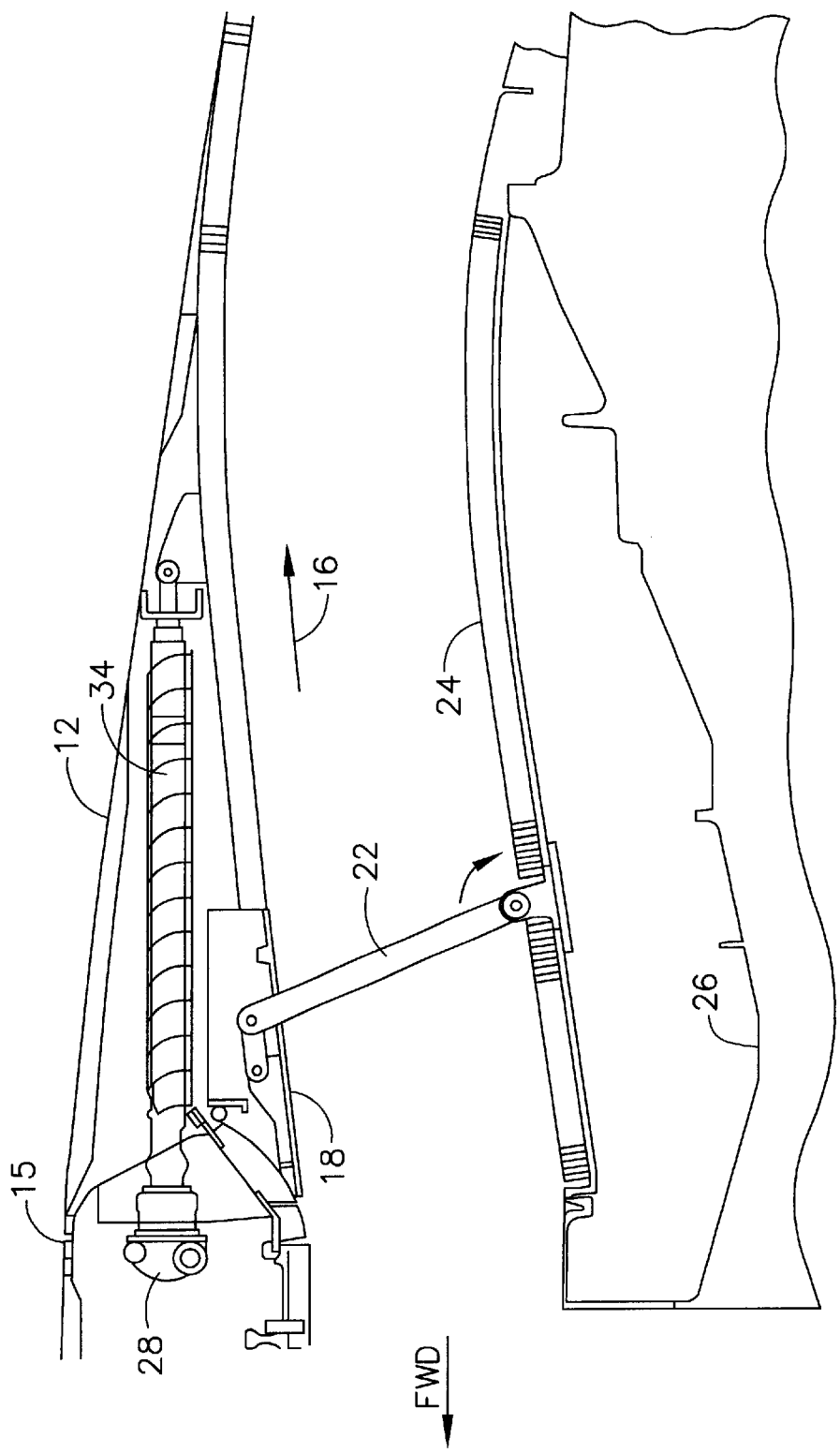
FIG. 3 is a partial cross section view taken along line 3—3 of FIG. 2.

As shown more particularly in FIGS. 2 and 3, the transcowls 12 cover a plurality of cascade vanes 14, which are positioned between the transcowls 12 and a bypass air flow path 16. When in the stowed position, as depicted in FIG. 3, the transcowls 12 are pressed against one or more stow seals 15. As noted previously, the stow seals 15 prevent air from flowing through the transcowls 12 when the thrust reversers are in the stowed position. A series of blocker doors 18 are mechanically linked to the transcowls 12 via a drag link 22 that is rotatably connected to an outer wall 24 that surrounds the engine case 26. In the stowed position, the blocker doors 18 form a portion of the outer wall 24 and are therefore oriented parallel to the bypass air flow path 16. When the thrust reversers are commanded to deploy, the transcowls 12 are translated aft, causing the blocker doors 18 to rotate into a deployed position, such that the bypass air flow path 16 is blocked. This also causes the cascade vanes 14 to be exposed and the bypass air flow to be redirected out the cascade vanes 14. The re-direction of the bypass air flow in a forward direction creates a reverse thrust and, thus, works to slow the airplane.

One or more actuators 28 per engine are used to operate the transcowls 12. The actuators 28 are mounted to a stationary torque box 32 and each includes an actuator element 34, such as a ball screw, that is connected to the transcowls 12. The actuators 28 interconnect with each other via a synchronization mechanism, such as a plurality of flexible shafts 36. The flexible shafts 36 ensure that the actuators 28 move at the same rate. Thus, when the actuators 28 rotate, the actuator elements 34 and the connected transcowls 12 are caused to translate at the same rate.

Figure 4:
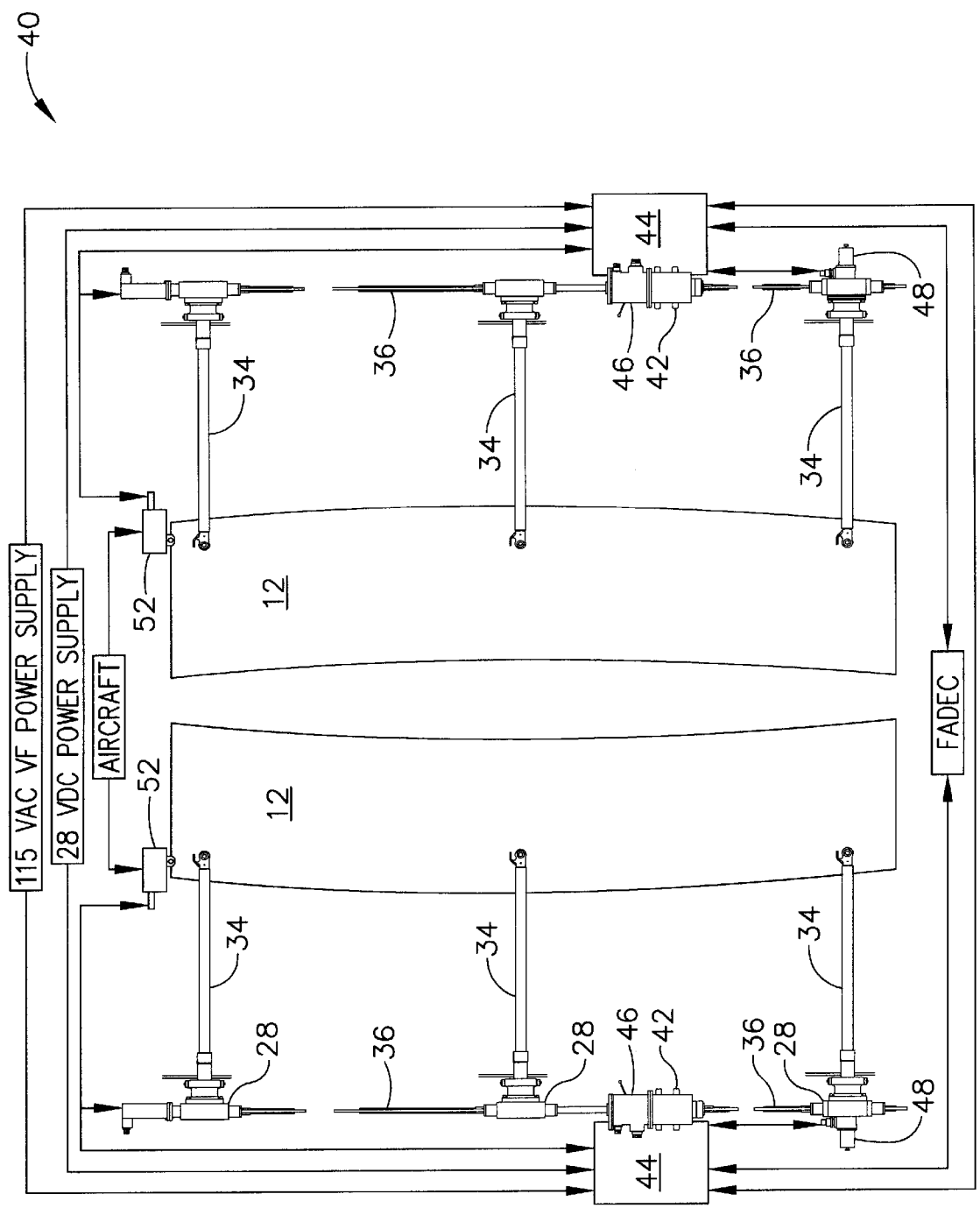
FIG. 4 is a simplified functional schematic representation of an exemplary thrust reverser system according to an embodiment of the present invention.

A control system controls movement of the transcowls 12 from a locked and stowed position to an unlocked and deployed position for producing reverse thrust, and returns the transcowls 12 from the deployed position back to the stowed and locked position. A simplified functional schematic representation of an exemplary thrust reverser control system is depicted in FIG. 4. The control system 40 includes a plurality of actuators 28, each connected to a transcowl 12 by a respective actuator element 34, and interconnected by a plurality of flexible shafts 36. Each of the plurality of actuators 28 is driven by an electric motor 42, that is controlled by a controller circuit 44. Additional details of the controller circuit 44 and its operation will be discussed in more detail herein below. A plurality of locking mechanisms, including at least a primary lock 46 and a secondary lock 48, prevent unintended movement of the transcowls 12 from the stowed position.

A position sensor 52 is used to sense the position of the transcowls 12. In a preferred embodiment, the position sensor 52 is a limit switch that senses at least when the transcowls 12 attain a predetermined position, which will be discussed more fully below. It will, however, be appreciated that the position sensor 52 is not limited to a limit switch. Rather, numerous other position or proximity sensing devices known in the art, non-limiting examples of which include a resolver, a piezo-resistive sensor, an optical sensor, an LVDT, an RVDT, and a potentiometer, may also be used.

Figure 5:
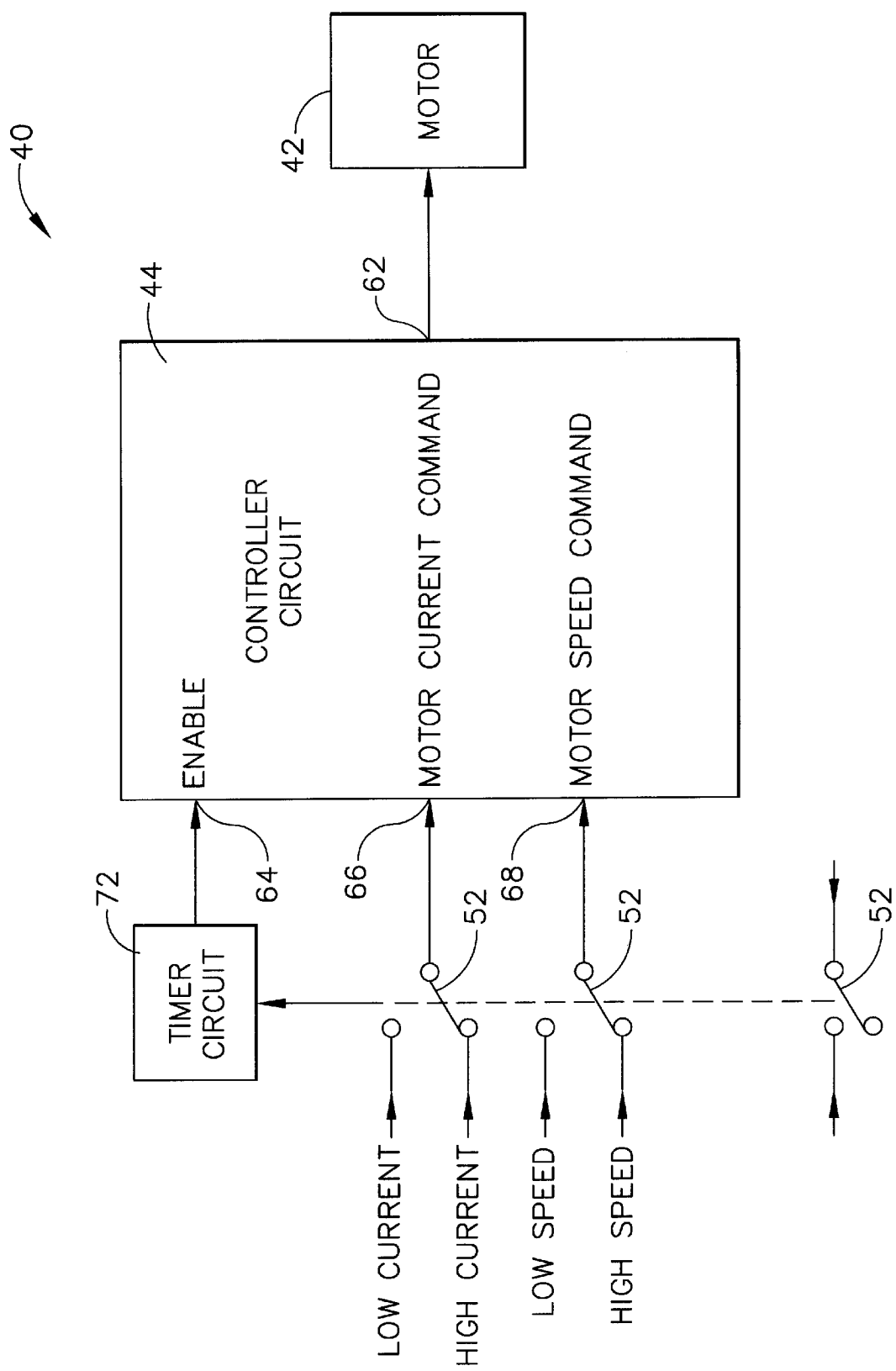
FIG. 5 is a schematic representation of a control system for the thrust reverser system depicted in FIG. 4.

Turning now to FIG. 5, which depicts a simplified schematic representation of the thrust reverser control system 40, along with a functional block diagram of a portion of the controller circuit 44, a discussion of a preferred embodiment of the present invention will be provided. As shown in FIG. 5, the controller circuit 44 includes an output port 62 that is electrically coupled to the motor 42. The controller circuit 44 further includes at least three input ports, which affect the operation of the controller circuit 44, and thus the motor 42. Specifically, the controller circuit 44 includes an ENABLE port 64, a MOTOR CURRENT COMMAND port 66, and a MOTOR SPEED COMMAND port 68.

The ENABLE port 64 controls whether the controller circuit 44 can supply power to the motor 42. For example, if the controller circuit 44 is designed to operate in a "positive logic" scheme, then a logic "high" signal at the ENABLE port 64 enables the controller circuit 44 to supply power to the motor 42, whereas a logic "low" disables the controller circuit 44 from doing so. Conversely, if the controller circuit 44 is designed to operate in a "negative logic" scheme, then a logic "low" signal at the ENABLE port 64 enables the controller circuit 44 to supply power to the motor, and a logic "high" disables the controller circuit 44. In either case, a timer circuit 72 includes an output that is electrically coupled to the ENABLE port 64. As will be described more fully below, the timer circuit 72 supplies the appropriate logic level signal to the ENABLE port 64 to enable or disable the controller circuit 44.

The signal supplied to the MOTOR CURRENT COMMAND port 66 establishes the maximum current magnitude that is supplied to the motor 42. A plurality of current command signals are available to be selectively coupled to the MOTOR CURRENT COMMAND port 66. In a preferred embodiment, the plurality of current command signals includes a "high" current command signal and a "low" current command signal. When the high current command signal is coupled to the MOTOR CURRENT COMMAND port 66, the controller circuit 44 (when enabled) limits the current supplied to the motor 42 to a relatively high magnitude. For example, in a preferred embodiment, in which the motor is a ten horsepower, brushless DC motor, the high current limit is set to 50 amps. Conversely, when the low current command signal is coupled to the MOTOR CURRENT COMMAND port 66, the controller circuit 44 (when enabled) limits the current supplied to the motor 42 to a relatively low magnitude. For example, for the preferred embodiment just discussed, the low current limit is set to about about 10 amps. The circumstances under which the high and low current command signals are supplied to the MOTOR CURRENT COMMAND port 66 will be discussed more fully later in the disclosure. It should be appreciated that, although the preferred embodiment utilizes only two current command signals, other numbers of current command signals could also be utilized.

The signal supplied to the MOTOR SPEED COMMAND port 68 establishes the rotational speed of the motor 42. A plurality of speed command signals are available to be selectively coupled to the MOTOR SPEED COMMAND port 68. In a preferred embodiment, the plurality of speed command signals includes a "low" speed command signal and a "high" speed command signal. When the high speed command is coupled to the MOTOR SPEED COMMAND port 68, the controller circuit 44 (when enabled) sets the target rotational speed of the motor 42 to a first magnitude. Conversely, when the low speed command signal is coupled to the MOTOR SPEED COMMAND port 68, the controller circuit 44 (wen enabled) sets the target rotational speed of the motor 42 to a second magnitude, that is less than the first magnitude. For example, in a preferred embodiment, the first rotational speed magnitude is 16,000 r.p.m., and the second rotational speed magnitude is 12,000 r.p.m. As is apparent to the skilled artisan, the particular first and second rotational speed magnitudes are only exemplary of a preferred embodiment, and the magnitudes may be varied to achieve the desired system response. Moreover, although the preferred embodiment utilizes two motor speed command signals, it will be appreciated that other numbers of motor speed command signals could be utilized.

The particular motor 42 may be one of numerous motor designs known in the art, including both DC and AC motors. The particular motor design and the concomitant current limit and rotational speed magnitudes are design variables chosen to meet the requirements of the particular thrust reverser system. The circumstances under which the high and low speed command signals are coupled to the MOTOR SPEED COMMAND port 68 will be discussed more fully herein below.

Figure 6:
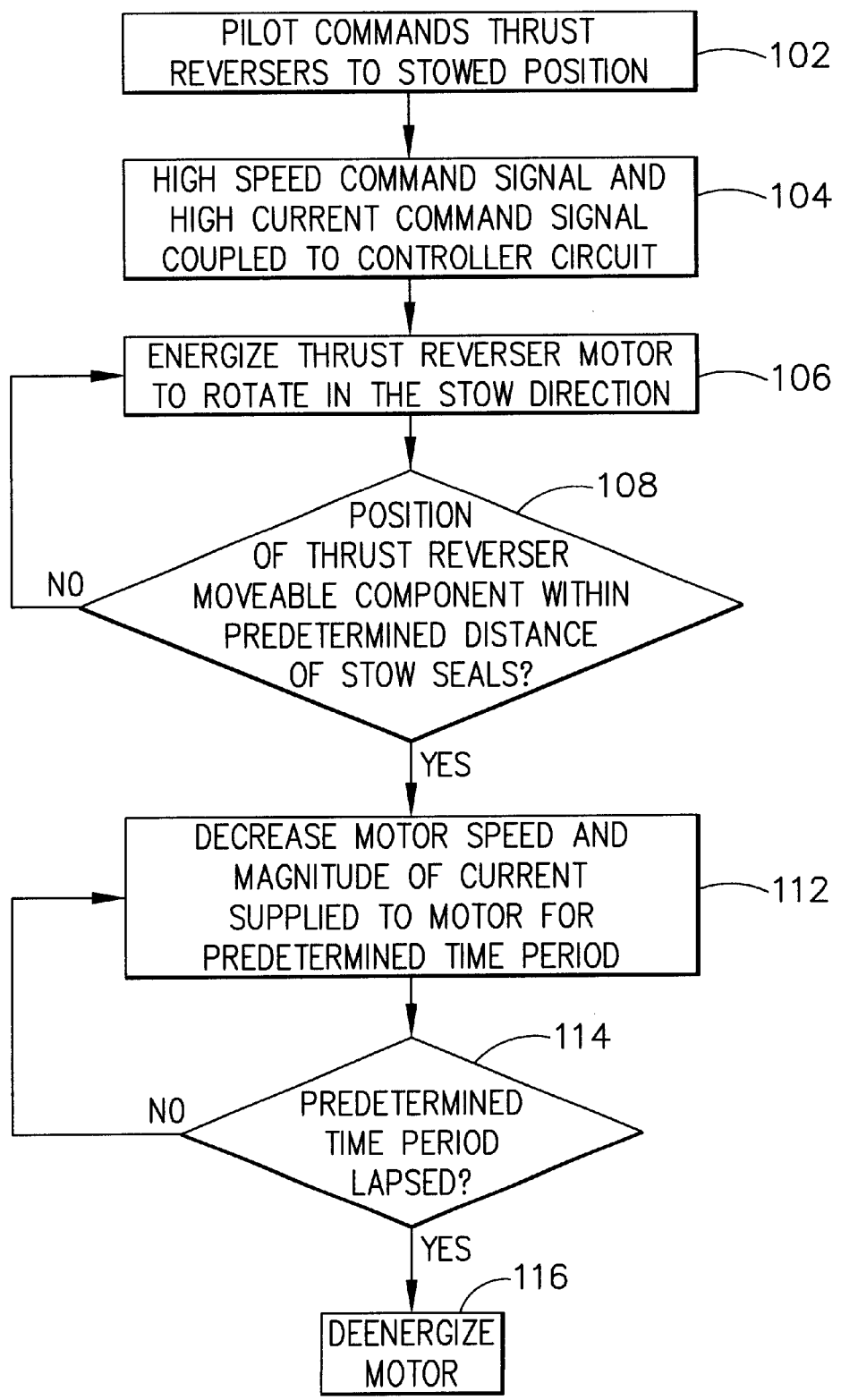
FIG. 6 is a flowchart depicting the method of controlling the stowage of the thrust reversers according to the present invention.

Having described the thrust reverser control system 40 specifically from a structural standpoint, and generally from a functional standpoint, a specific description of a particular functional aspect of the present invention will now be provided. In this regard, reference should now be made to FIGS. 5 and 6 in combination, while a description of a stowage operaton of the thrust reverser system is provided. This description is predicated on the thrust reverser system initially being in the deployed position, and is being returned to the stowed position. Additionally, the parenthetical references to "STEPs" correspond to the particular reference numerals of the methodological flow 100 depicted in FIG. 6.

With the above-described background in mind, the description of the stowage operation will now be provided. When the thrust reversers are no longer needed, the pilot commands the thrust reversers to return to the stowed position (STEP 102). The high speed command and high current command are initially coupled to the MOTOR SPEED COMMAND port 68 and the MOTOR CURRENT COMMAND port 66, respectively, (STEP 104). Thus, upon initiating the stow command, the controller circuit 44 is enabled and causes the motor 42 to rotate in the stow direction at the high speed, while the current supplied to the motor 42 is limited to the higher magnitude (STEP 106). As a result, the actuators 28 rotate, causing the actuator elements 34 to translate the connected transcowls 12 to the stowed position.

While the transcowls 12 are translating toward the stowed position, the position sensor 52 senses whether or not the transcowls 12 have attained a predetermined position (STEP 108). In a preferred embodiment, the predetermined position is within 10% of the stow seals 15; however, the invention is not limited to this particular predetermined position because the size and capacity of the various components may be altered for particular applications. The transcowls 12 continue to translate at the high speed, with the high current limit imposed, until the predetermined position is attained. Once the predetermined position is attained, as sensed by the position sensor 52, the speed command signal coupled to the MOTOR SPEED COMMAND port 68 is selectively switched to the high speed command signal to the low speed command signal. Additionally, the current command signal coupled to the MOTOR CURRENT COMMAND port 66 is selectively switched from the high current command signal to the low current command signal (STEP 112). Simultaneously, the timer circuit 72 is "triggered." Thus, the rotational speed and the current magnitude supplied to the motor 42 are both reduced for a predetermined period of time established in the timer circuit 72 (STEP 114). In a preferred embodiment, this predetermined time period is approximately 1.0 second. However, the present invention is not so limited, and may be set to other time periods. Once the predetermined time period has lapsed, the timer circuit 72 outputs an appropriate signal to the ENABLE port 64, thereby disabling the controller circuit 44 and de-energizing the motor 42 (STEP 116).

The stowage process 100, and the control system 40 that implements the process, reduces the power supplied to the motors 42 and the speed at which the motors 42 operate for a predetermined time period during the last portion of transcowl 12 movement to the stowed position. Thus, the limit cycle, where the transcowls cycle between stowing into the seals 15 and bouncing back off of them, with the concomitant risk of the stow locks 46, 48 missing engagement is avoided. Instead, the transcowls 12 are allowed to stall against the stow seals 15 at a reduced power level for a sufficient amount of time to let the stow locks 46, 48 engage. Moreover, the reduced power level and speed prevents structural damage when the transcowls 12 are driven against the stow seals 15.

As indicated previously, the present invention is not limited to use with a cascade-type thrust reverser system, but can be incorporated into other thrust reverser design types. Moreover, the methodology of the present invention is not limited to use with an electric or electromechanical thrust reverser actuation system. Rather, the methodology of the present invention can be incorporated into other actuation system designs, including hydraulic and pneumatic.

Additionally, the circuit components of the present invention are not limited to that explicitly depicted herein. Indeed, the circuit components may be formed of either discrete components, or incorporated into a single integrated circuit. Moreover, the process carried out by the electrical components may be realized using software driven devices, or it may be carried out using analog devices and signals, or a combination of both.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for controlling one or more jet engine thrust reversers, comprising:
    an electric motor;
    one or more moveable thrust reverser components coupled to the motor, the one or more components moveable between a deployed position and a stowed position;
    a position sensor operable to provide a position signal at least when the one or more moveable thrust reverser components attain a predetermined position relative to the stowed position;
    a controller circuit operably coupled to the motor and responsive to the position signal to rotate the motor at a variable speed; and
    a timer circuit having an output coupled to the controller circuit and responsive to the position sensor to cause the controller to remove power provided to the motor a predetermined time period after the one or more moveable thrust reverser components attain the predetermined position.

2. The system of claim 1, wherein the controller circuit includes a motor speed command input port coupled to receive one of a plurality of motor speed command signals.

3. The system of claim 2, wherein the plurality of motor speed command signals includes at least a low speed command signal and a high speed command signal.

4. The system of claim 3, wherein the motor speed command input port is coupled to receive the low speed command signal in response to the position sensor sensing that the predetermined position is attained.

5. The system of claim 1, wherein said controller includes a motor current command input port coupled to receive one of a plurality of current command signals, the controller being operable to limit a current magnitude supplied to the motor in response to the received current command signal.

6. The system of claim 5, wherein the plurality of current limit command signals includes at least a high current command signal and a low current command signal.

7. The system of claim 6, wherein the motor current command input port is coupled to receive the low current command signal in response to the position sensor sensing that the predetermined position is attained.

8. The system of claim 1, wherein the position sensor comprises a limit switch.

9. The system of claim 1, wherein the position sensor is selected from the group consisting of an LVDT, an RVDT, an optical sensor, and a potentiometer.

10. The system of claim 1, wherein the motor is coupled to the one or more moveable thrust reverser components via one or more actuator elements.

11. A system for controlling one or more jet engine thrust reversers, comprising:
    moving means for moving one or more moveable thrust reverser components between a deployed position and a stowed position;
    position sensing means for sensing at least when the one or more moveable thrust reverser components attain a predetermined position relative to the stowed position;
    controller means for causing the moving means to move at a variable speed in response to the position sensing means sensing that the predetermined position is attained; and
    timer means, responsive to the position sensing means, for causing the controller means to remove power supplied to the moving means a predetermined time period after the one or more moveable thrust reverser components attain the predetermined position.

12. The system of claim 11, wherein the controller means includes a speed command input port for receiving one of a plurality of speed command signals.

13. The system of claim 12, wherein the plurality of speed command signals includes at least a low speed command signal and a high speed command signal.

14. The system of claim 13, wherein the speed command input port is coupled to receive the low speed command signal in response to the position sensing means sensing that the predetermined position is attained.

15. The system of claim 11, wherein the controller means includes a power command input port coupled to receive one of a plurality of power command signals, the controller means limiting a power signal to the moving means in response to the received power command signal.

16. The system of claim 15, wherein the plurality of power commands includes at least a high power command signal and a low power command signal.

17. The system of claim 16, wherein the power command input port is coupled to receive the low power command signal in response to the sensing means sensing that the predetermined position is attained.

18. The system of claim 11, wherein the moving means is coupled to the one or more thrust reverser moveable components via one or more actuator elements.

19. A system for controlling one or more jet engine thrust reversers, comprising:
    an electric motor;
    one or more moveable thrust reverser coupled to the motor, the one or more components moveable between a deployed position and a stowed position;
    a position sensor operable to provide a position signal at least when the one or more moveable thrust reverser components attain a predetermined position relative to the stowed position;
    a controller circuit including:
        (a) a motor speed command input port coupled to receive one of at least a low speed command signal and a high speed command signal, (b) a motor current command input port coupled to receive one of at least a high current command signal and a low current command signal, and (c) an output port operably coupled to the motor and being: (i) responsive to the position signal to rotate the motor at a variable speed and (ii) responsive to the current command signal to limit a current magnitude supplied to the motor; and a timer circuit including an output coupled to the controller circuit and responsive to the position sensor to cause the controller circuit to remove power provided to the motor a predetermined time period after the one or more moveable thrust reverser components attain the predetermined position, wherein the low speed command signal and the low current command signal are received in response to the position sensor sensing that the predetermined position is attained.

20. A method of controlling one or more jet engine thrust reversers, comprising:

causing movement by an electric motor of one or more moveable thrust reverser components toward at least a stowed position;

sensing with a sensor at least when the one or more moveable thrust reverser components attain a predetermined position relative to the stowed position;

selectively varying a speed of the movement of the one or more moveable thrust reverser components with a controller circuit in response to the one or more moveable thrust reverser components attaining the predetermined position; and disabling the movement of the one or more moveable thrust reverser components a predetermined time period alter sensing that the one or more moveable thrust reverser components have attained the predetermined position using a timer circuit having an output coupled to the controller circuit and responsive to the sensor to cause the controller to remove power to the motor.

21. The method of claim 20, wherein the step of selectively varying the speed of the movement of the one or more moveable thrust reverser components occurs in response to selectively providing one of a plurality of speed commands.

22. The method of claim 21, wherein the plurality of speed commands includes at least a low speed command and a high speed command.

23. The method of claim 22, wherein the low speed command is provided in response to the one or more moveable thrust reverser components attaining the predetermined position.

24. The method of claim 20, further comprising:

selectively varying a magnitude of power causing the movement of the one or more moveable thrust reverser components in response to selectively providing one of a plurality of power commands.

25. The method of claim 24, wherein the plurality of power commands includes at least a high power command and a low power command.

26. The method of claim 25, wherein the low power command is provided in response to the one or more moveable thrust reverser components attaining the predetermined positon.

\* \* \* \* \*